(12) United States Patent
Cerioni et al.

(10) Patent No.: US 6,900,971 B2
(45) Date of Patent: May 31, 2005

(54) POWER SUPPLY DEVICE

(75) Inventors: Riccardo Cerioni, Rome (IT); Walter Turati, Sesto San Giovanni (IT)

(73) Assignee: ABB Service S.r.l., Milan (IT)

( * ) Notice: Subject to any disclaimer, the term of this patent is extended or adjusted under 35 U.S.C. 154(b) by 28 days.

(21) Appl. No.: 10/169,402

(22) PCT Filed: Dec. 29, 2000

(86) PCT No.: PCT/EP00/13388
§ 371 (c)(1),
(2), (4) Date: Jul. 1, 2002

(87) PCT Pub. No.: WO01/50569
PCT Pub. Date: Jul. 12, 2001

(65) Prior Publication Data
US 2003/0011954 A1 Jan. 16, 2003

(30) Foreign Application Priority Data
Dec. 31, 1999 (IT) ..................................... MI1999A2766
Sep. 27, 2000 (IT) ..................................... MI2000A2100

(51) Int. Cl.$^7$ .............................. H02H 3/00; H02H 7/00
(52) U.S. Cl. ........................................... 361/65; 361/42
(58) Field of Search .......................... 361/65, 94, 93.6; 307/82, 104

(56) References Cited

U.S. PATENT DOCUMENTS

| 4,562,506 A | * | 12/1985 | Moran ......................... 361/71 |
| 4,685,022 A | * | 8/1987 | Nichols et al. ............... 361/44 |
| 5,170,310 A | * | 12/1992 | Studtmann et al. .......... 361/94 |
| 5,392,188 A | * | 2/1995 | Epstein ....................... 361/118 |
| 5,617,284 A | * | 4/1997 | Paradise ..................... 361/58 |
| 5,982,642 A | | 11/1999 | Herfurth |

OTHER PUBLICATIONS

P. Horowitz et al., The Art of Electronics, 1989, Cambridge University Press, 2nd edition, pp. 345, 355–368.*

* cited by examiner

Primary Examiner—Stephen W. Jackson
Assistant Examiner—Z Kitov
(74) Attorney, Agent, or Firm—Connolly Bove Lodge & Hutz LLP; Larry J. Hume

(57) ABSTRACT

A power supply device for an electronic protection unit for AC/DC low- and/or medium-voltage power networks, comprising:
  first electronic means, which are suitable to transduce electric power from an AC/DC low- and/or medium-voltage power distribution line in nominal operating conditions; and
  second electronic means, which are suitable to transduce energy from an AC/DC low- and/or medium-voltage power distribution line in current transient conditions.

11 Claims, 6 Drawing Sheets

| LEGEND | | | |
|---|---|---|---|
| 2 | ELECTR. PROT. UNIT | 101 | CMD. SIGNALS |
| 3 | PWR DISTR. LINE | 102 | TRIGGERING DEVICE |
| 4 | 1ST ELECTR. MEANS | 350 | POLE |
| 5 | 2ND ELECTR. MEANS | L1-L3 | PHASE LINES OF 3 |

| LEGEND | | | |
|---|---|---|---|
| 2 | ELECTR. PROT. UNIT | 102 | TRIGGERING DEVICE |
| 3 | PWR DISTR. LINE | 350 | POLE |
| 4 | 1ST ELECTR. MEANS | L1-L3 | PHASE LINES OF 3 |
| 5 | 2ND ELECTR. MEANS | 360 | LOAD |
| 101 | CMD. SIGNALS | | |

| LEGEND | | | |
|---|---|---|---|
| 2 | ELECTR. PROT. UNIT | 102 | TRIGGERING DEVICE |
| 3 | PWR DISTR. LINE | 350 | POLE |
| 4 | 1ST ELECTR. MEANS | L1-L3 | PHASE LINES OF 3 |
| 5 | 2ND ELECTR. MEANS | 360 | LOAD |
| 101 | CMD. SIGNALS | | |

POWER SUPPLY DEVICE

BACKGROUND

The present invention relates to a power supply device for an electronic protection unit, suitable for the use in AC/DC power distribution networks at low or medium voltages (i.e. voltages below 100 KV).

It is known that an electronic protection unit is generally used, in a power distribution line, in order to send tripping signals to a tripping device (such as a circuit breaker), which is able to interrupt, if necessary, said power distribution line.

It is also known that an electronic protection unit requires an external power supply device, capable of providing the energy required for its operation.

In particular, it is also known that a very important requirement for an electronic protection unit is to be self-powered. This means that the power supply device of an electronic protection unit must draw the required power from the power distribution line, with which the electronic protection unit is associated. In fact, this allows ensuring high levels of reliability and continuity of service, since a self-powered electronic protection unit allows to perform constant monitoring of the power distribution line and to implement advantageous auxiliary functions.

Examples of power supply devices are known in the state of the art. Electronic protection units for AC power distribution lines adopt, as power supply devices, one or more current-sensing transformers, which are suitable to convert the energy of the magnetic field generated by the power distribution line itself. This technical solution, however, has drawbacks. Although current-sensing transformers are reliable devices, they are very often quite bulky, particularly as the operating voltage rises. Furthermore, they are characterized by high installation costs, which have a severe effect on the final costs of the electronic protection unit.

Furthermore, as it is known, current-sensing transformers cannot be used to supply an electronic protection unit, associated with a DC power distribution line. Therefore, in case of a DC power distribution line different arrangements must be used.

Known devices, which are adopted to supply power electronic protection units for DC power distribution lines, are characterized by drawbacks, too. Practice has shown that these devices are generally capable of supplying an electronic protection unit for relatively low operating voltage values (for example 300 V). This drawback is particularly disadvantageous, since a power supply for much higher voltages is generally required (for example for low-voltage power distribution lines at voltages up to 1 KV, maintaining 12 KV of insulation). This entails the need to provide technical constructive solutions, which are relatively complicated and expensive in order to provide the self-powering of the electronic protection unit and at the same time ensure adequate insulation. Power supply devices for electronic protection units for DC power distribution lines have many difficulties in allowing to supply the electronic protection unit during current transients. This fact entails a decrease in the levels of reliability and continuity of service that can be ensured by an electronic protection unit.

SUMMARY

Therefore, the aim of the present invention is to provide a power supply device for low- and/or medium-voltage electronic protection units, which allows overcoming the described drawbacks.

Within the scope of this aim, an object of the present invention is to provide a power supply device, which can be used both for AC power distribution lines and for DC power distribution lines.

Another object of the present invention is to provide a power supply device, which can be used in nominal operating conditions and in the presence of current transients, particularly in the presence of a short circuit.

Another object of the present invention is to provide a power supply device, which is highly reliable, relatively simple to manufacture and at competitive costs.

Thus, the present invention provides a power supply device for an electronic protection unit for a power distribution line. The electronic protection unit comprises sensor means, which provide sensing signals indicative of the physical quantities related to said power distribution line and a control unite which receives said sensing signals and which provides, based on said sensing signals, command signals to a tripping device, associated to said power distribution line.

The power supply device, according to the present invention is characterized in that it comprises first electronic means, which are suitable to transduce electric power from said power distribution line in nominal operating conditions and second electronic means, which are suitable to transduce energy from said power distribution line in current transient operating conditions, so as to take over said first electronic means.

The power supply according to the invention allows achieving the intended aim and objects.

The first and second electronic means in fact allow to obtain from a low- or medium-voltage AC/DC power distribution line the energy required to supply the electronic protection unit both in nominal operating conditions and in current transient conditions and particularly in the presence of a short-circuit. In this manner it is possible to provide the self-powering of the electronic protection unit in any operating condition, while ensuring the operation of the electronic protection unit in any operating condition as well as high levels of operation and safety.

BRIEF DESCRIPTION OF THE DRAWINGS

Further characteristics and advantages of the invention will become more apparent from the description of preferred but not exclusive embodiments of the power supply device, according to the invention, illustrated only by way of non-limitative example in the accompanying drawings, wherein.

DETAILED DESCRIPTION

Figure 1:
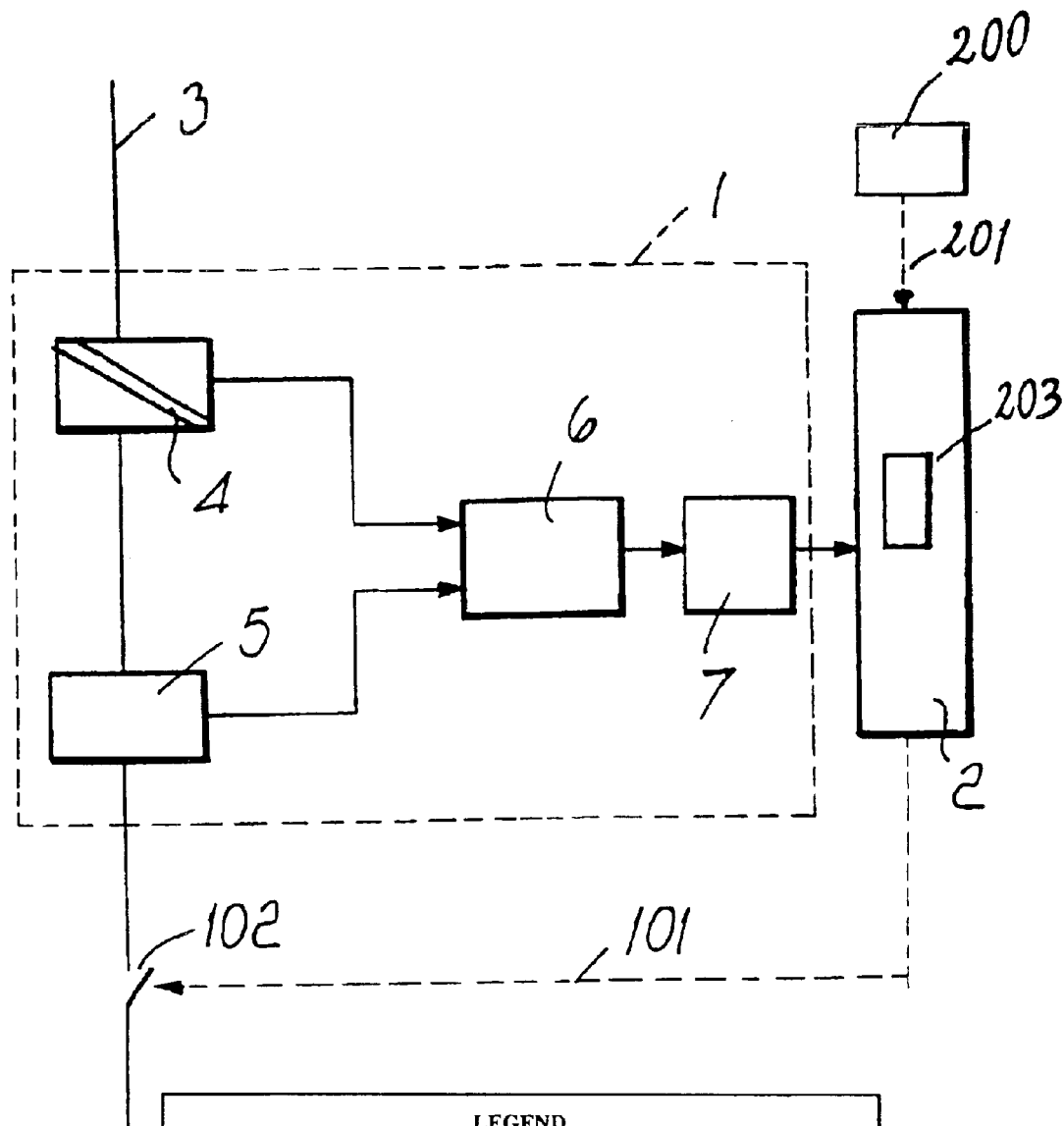
FIG. 1 is a schematic view of the power supply device, according to the invention.

With reference to FIG. 1, the power supply device 1, according to the present invention, is aimed at supplying power to an electronic protection unit 2, for the use in a power distribution line 3. The electronic protection unit 2 comprises sensor means 200, which provide sensing signals 201, indicative of the physical quantities related to the power distribution line 3. Further, the electronic protection unit 2 comprises a control unit 203, which receive the sensing signals 201 and which provides, based on the sensing signals 201, command signals 101 to a tripping device 102, associated to the power distribution line 3 and suitable for interrupting the power distribution line 3.

The power supply device 1 comprises first electronic means 4, which are suitable to transduce energy from the power distribution line 3 in nominal operating conditions. The power distribution line 3 can be a low- or medium-voltage AC or DC power distribution line and can also be of the single-phase type, as shown in FIG. 1, or a three-phase line or, more generally, a multiple-phase line.

The power supply device 1 furthermore comprises second electronic means 5, which are suitable to transduce energy from the power distribution line 3 during a current transient, particularly a short-circuit current. The second electronic means 5 are aimed at taking over the first electronic means 4, when a condition of current transient is present.

It should be noticed that, thanks to the first electronic means 4 and the second electronic means 5, the electronic protection unit 2 is active in any state of the power distribution line 3.

For example, when the power distribution line 3 is in an overload state (i.e when the current is above the nominal level, while the voltage is within nominal values), the electronic protection unit 2 can command the tripping unit 102 after a predefined period of time, if no state changes occur. When the power distribution line 3 is in a selective short-circuit state (the current values remain a few times higher than the nominal current while the voltage is within tolerance values), the electronic protection unit 2 can command, in any case, the tripping unit 102 after a predefined period of time. When the power distribution line 3 is in a instantaneous short-circuit state (i.e. when the current values exceed tens of times the nominal current values), the electronic protection unit 2 can command instantaneously the tripping unit 102 and, therefore, the interruption of the power distribution line 3 physically occurs in few milliseconds.

This happens also when a latent short-circuit state (i.e. a short-circuit state, which becomes apparent upon the re-closure of the power distribution line 3, after an interruption) is present.

The power supply 1 comprises third electronic means 6, which are electrically connected to the first electronic means 4 and/or to the second electronic means 5. The third electronic means 6 are suitable to store the energy, which is transduced by the first electronic means 4 and/or by the second electronic means 5. The power supply 1 comprises also fourth electronic means 7, which are electrically connected between the third electronic means 6 and the electronic protection unit 2. The fourth electronic means 7 are suitable to transfer the energy stored by the third electronic means 6 to the electronic protection unit 2 and to electrically insulate the electronic protection unit 2 from the third electronic means 6. In practice, the first electronic means 4, the second electronic means 5 and the third electronic means 6 ensure the possibility to extract and store energy from the power distribution line 3 in any operating condition. The fourth electronic means 7 instead ensure the transfer of the accumulated energy to the electronic protection unit 2 and, at the same time, the insulation of the electronic protection unit 2 from the portion of the power supply that is directly connected to the power distribution line 3. In this manner, the electronic protection unit 2 is self-powered both in nominal operating conditions and during operation in the presence of a current transient (particularly in the presence of a short-circuit). The electronic protection unit 2 can, therefore, trip regardless of the conditions of the power distribution line 3, thus ensuring maximum reliability and continuity of service. At the same time, it is possible to ensure high levels of insulation of the electronic protection unit 2 with respect to the power distribution line 3.

Figure 2:
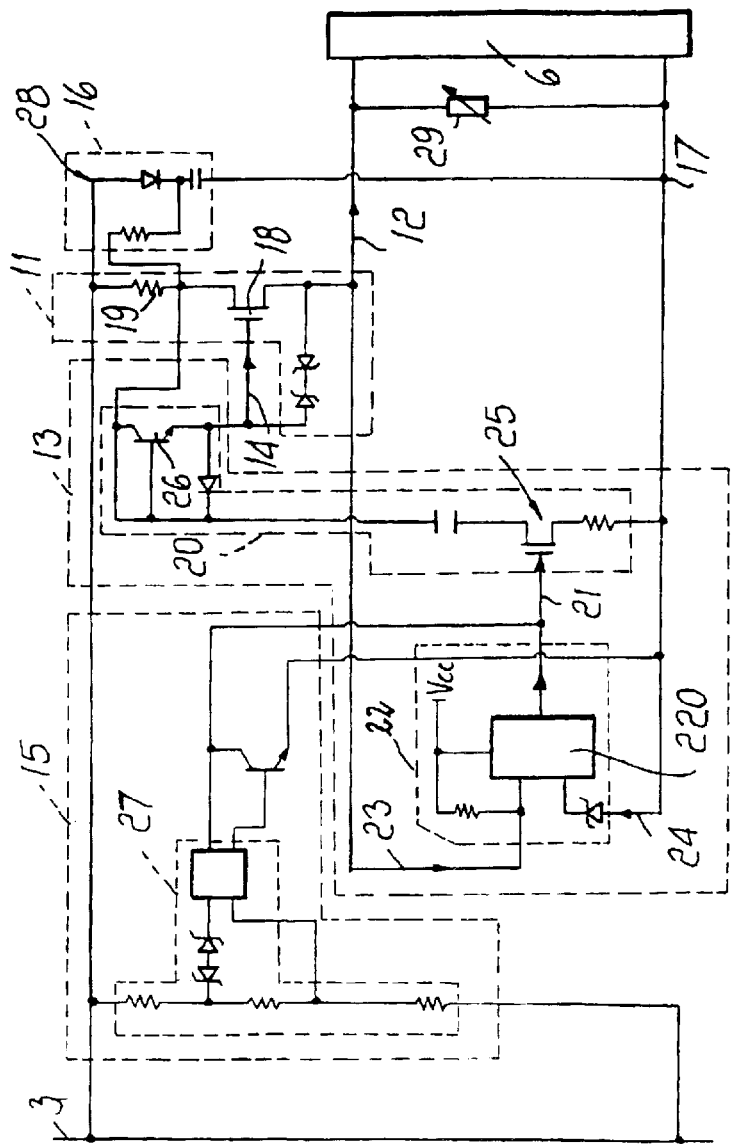
FIG. 2 is a schematic view of a preferred embodiment of a portion of the power supply device, according to the invention.

A preferred embodiment of the first electronic means 4 is now described with reference to FIG. 2.

The first electronic means 4 preferably comprise an electronic charging stage 11, which is electrically connected to the third electronic means 6 and to the power distribution line 3. The electronic charging stage 11 provides, in nominal operating conditions, a charging current 12 to the third electronic means 6. Preferably, the first electronic means 4 also comprise an electronic stabilization stage 13, which is electrically connected to the electronic charging stage 3 and to the third electronic means 6. The electronic stabilization stage 13 is suitable to provide the electronic charging stage 11 with driving signals 14 in order to adjust, in nominal operating conditions, the charging current 12 supplied to the third electronic means 6.

In a particularly advantageous embodiment, the first electronic means 4 also comprise a first electronic protection stage 15, which is electrically connected between the electronic charging stage 11, the power distribution line 3 and the electronic stabilization stage 13. Advantageously, the first electronic means also comprise a second electronic protection stage 16, which is electrically connected between the electronic charging stage 11 and the ground 17.

In an advantageous embodiment, the electronic charging stage 11 comprises an active circuit element 18 (for example a transistor of the MOSFET type), which is electrically connected, by means of a resistive network 19, to the first electronic protection stage 15 or, as an alternative, directly to the power distribution line 3. Preferably, the electronic stabilization stage 13 comprises an electronic driving circuit 20, which is suitable to receive one or more control signals 21 and to generate, on the basis of the control signals 21, one or more driving signals 14 for regulating the operation of the active circuit element 18. Advantageously, the electronic stabilization stage 13 also comprises a first electronic comparator stage 22, which is suitable to generate the control signals 21 on the basis of a feedback signal 23 which is representative of the charging state of the third electronic means 6. In practice, the electronic comparator stage 22 comprises a comparator 220, which receives the feedback signal 23 and performs a comparison with a reference signal 24. In this manner, the control signal 21 is generated and switches on/off an active circuit element 25 (for example a transistor of the MOSFET type) of the electronic driving circuit 20. The on/off state of the active circuit element 25 in turn determines the on/off state of an active circuit element 26 (for example a transistor of the BJT type) of the electronic driving circuit 20. Depending on the on/off state of the active circuit element 26, the driving signal 14 is generated and in turn determines the on/off state of the active circuit element 18 of the charging circuit 11. The succession of on/off states of the active circuit element 18 of the charging circuit 11 allows to obtain an adjustment of the on/off type of the charging current 12.

Preferably, the first protection stage 15 comprises an optoelectronic protection circuit, which is capable of detecting, on the power distribution line 3, the presence of relatively long voltage pulses. If relatively long voltage pulses (which intrinsically have a high energy content) are present, the optoelectronic circuit 27 sends a control signal 21, which is suitable to cause the generation, on the part of the driving circuit 20, of a driving signal 14, which is suitable to switch on the active element 18 of the charging circuit 11. The energy content of the voltage pulse can thus be absorbed both by the resistive network 19 and by a varistor 29, which is arranged in parallel to the third electronic means 6. In this manner, a relatively long pulse (having a high energy content) on the power distribution line 3 does not produce dangerous overvoltages across the components of the first electronic means 4.

Preferably, the second protection stage 16 comprises a so-called passive "snubber network" which is suitable to absorb relatively short voltage pulses (which as such have a relatively low energy content). The passive snubber network 28 is advantageously arranged across the resistive network 19, so as to avoid the onset of overvoltages across the active element 18 of the charging circuit 11.

Advantageously, the electronic stabilization stage 13 can comprise also an active circuit element (for example the active circuit element 26), which is suitable to absorb voltage pulses arriving from the power distribution line 3, if the voltage of the power distribution line 3 is closed to zero. In this case, in fact, the active circuit element 26 would be forced in conduction on and would, in turn, force in conduction the active circuit element 18 of the charging circuit 11. Therefore, also in this case, the energy content of a voltage pulse can be absorbed both by the resistive network 19 and by a varistor 29, which is arranged in parallel to the third electronic means 6.

Figure 3:
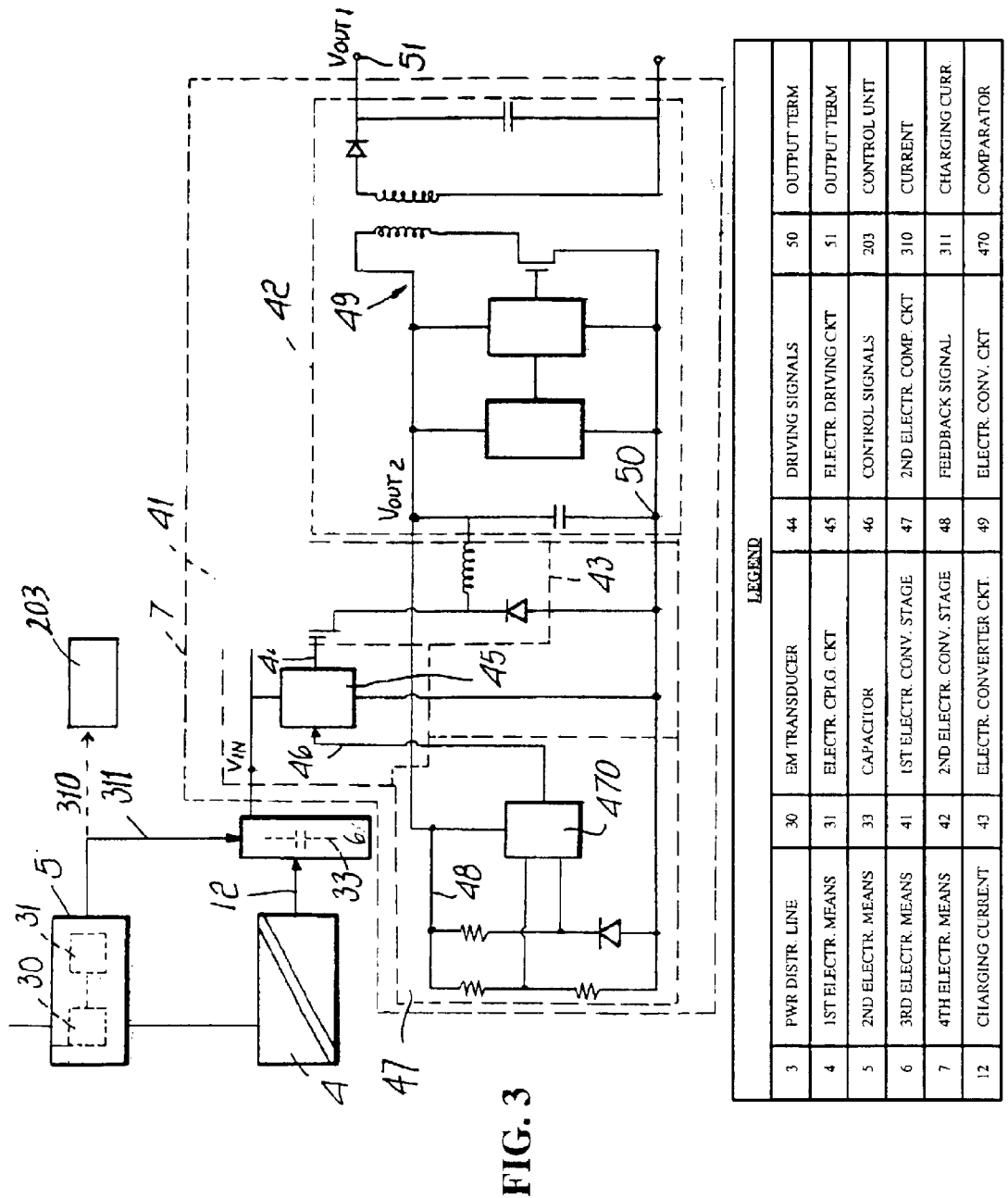
FIG. 3 is a schematic view of a preferred embodiment of another portion of the power supply device, according to the invention.

With reference now to FIG. 3, the second electronic means 5 comprise an electromagnetic transducer 30, which is operatively connected to the power distribution line 3. The electromagnetic transducer 30, which can advantageously comprise a pick-up coil arranged on the power distribution line 3, is suitable to generate, during a current transient, a charging current 311 for the third electronic means 6. Advantageously, the second electronic means 5 also comprise an electronic coupling stage 31 which comprises, for example, a diode network and is suitable to electrically connect the electromagnetic transducer 30 to the third electronic means 6. In an alternative embodiment, a current 310 may be generated for supplying power directly to the control unit 203. The pick up coil may comprise a current transformer including magnetic or air-insulated core with a secondary winding, whose number of turns depends on the energy to be transduced. The magnetic core may be made of ferromagnetic material, which can be chosen from a wide range of commercial materials with relatively low magnetic permeability and modest saturation. The conductors of the power distribution line 3 are considered as the primary winding of said current transformer.

In a preferred embodiment of the present invention, the third electronic means 6 comprise one or more capacitive elements 33. The capacitive elements 33 are suitable to receive a charging current 12 from the first electronic means 4 (during a nominal operating condition) and/or a charging current 311 from the second electronic means 5 (during an operating condition in the presence of a current transient). Further, they are suitable to generate a charging voltage $V_{IN}$. The capacitive elements 33 can be sized so as to be able to provide a charging voltage $V_{IN}$ for a predefined period of time, even if the voltage of the power distribution line 3 becomes closed to zero (for example in the case of a short-circuit). The charging voltage $V_{IN}$ is received in input by the fourth electronic means 7, which provide an output voltage $V_{OUT1}$ having a predefined value in order to supply the control unit 203 and, more in general, the electronic protection unit 2.

Again with reference to FIG. 3, the fourth electronic means 7 preferably comprise a first electronic converter stage 41. which is suitable to receive in input the charging voltage $V_{IN}$ and to generate a second output voltage $V_{OUT2}$ having a predefined value. Preferably, the third electronic means 7 comprise a second electronic converter stage 42, which is suitable to receive in input the second output voltage $V_{OUT2}$ and to generate the first output voltage having a predefined value $V_{OUT1}$. The second converter stage 42 is furthermore suitable to electrically insulate the electronic protection unit 2 from the first converter stage 41.

Advantageously, the first electronic converter stage 41 comprises an electronic conversion circuit 43 in a step-down configuration, which is suitable to receive in input the charging voltage $V_{IN}$ and to generate, following the reception of one or more driving signals 44, the second output voltage $V_{OUT2}$. Furthermore, the first electronic stage 41 advantageously comprises an electronic driving circuit 45. The electronic driving circuit 45 is suitable to receive one or more control signals 46 and to generate, on the basis of the control signals 46, one or more driving signals 44 in order to regulate the operation of the first electronic conversion circuit 43. The control signals 46 can be advantageously generated by a second electronic comparator circuit 47 (comprising a comparator element 470) on the basis of a feedback signal 48, which is representative of the value of the second output voltage $V_{OUT2}$. In this manner, the first electronic stage 41 is capable of considerably reducing the start-up time of the system and to maximize the amount of energy extracted by the third electronic means 6. Preferably, the second electronic converter stage 42 comprises an electronic conversion circuit 49 in a flyback configuration. The electronic conversion circuit 49 is electrically connected to the electronic conversion circuit 43 and receives in input the second output voltage $V_{OUT2}$.

By virtue of the flyback-type configuration, the conversion circuit 42 is capable of generating the first output voltage $V_{OUT1}$ having a predefined value. In the same time, it is able to maintain electrical insulation between the output terminals 50 of the first electronic converter stage 41 and the output terminals 51 of the second electronic converter stage 42. In fact, regulation of the conversion circuit 42 does not require a direct feedback, which would otherwise have to be insulated.

Figure 4:
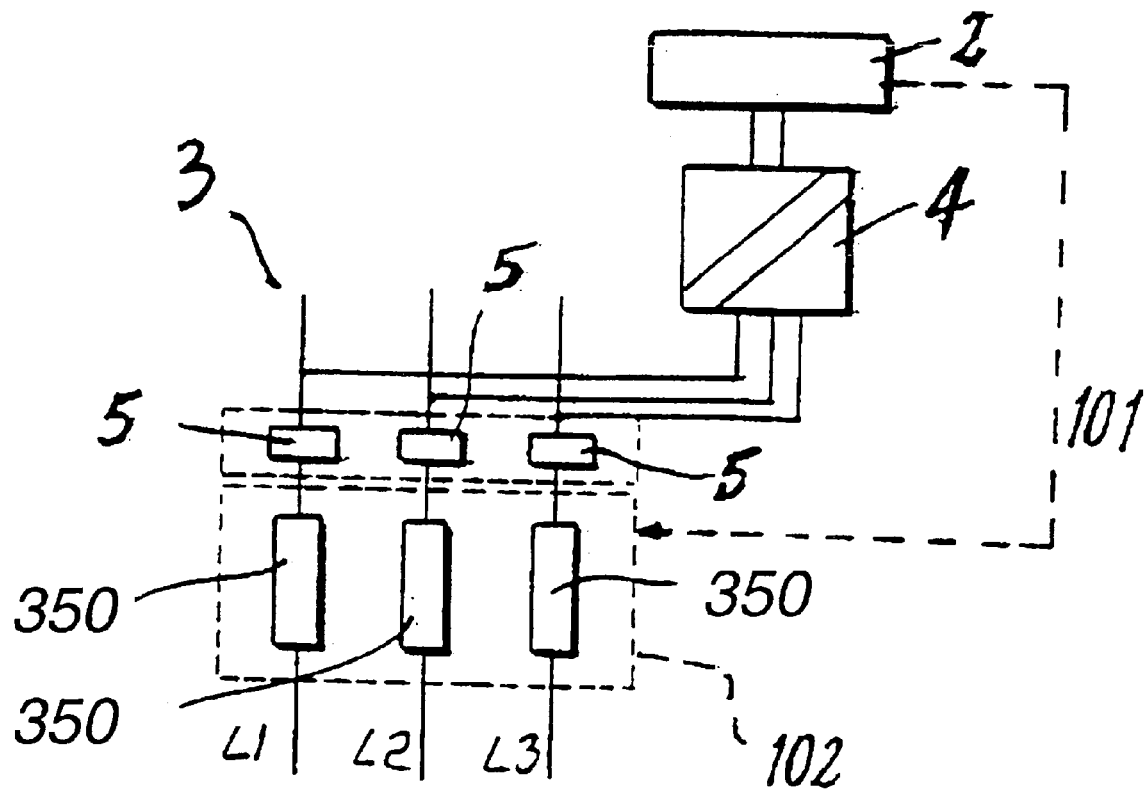
FIG. 4 represents schematically an example of installation of the power supply device, according to the invention, on a AC power distribution line.
Figure 5:
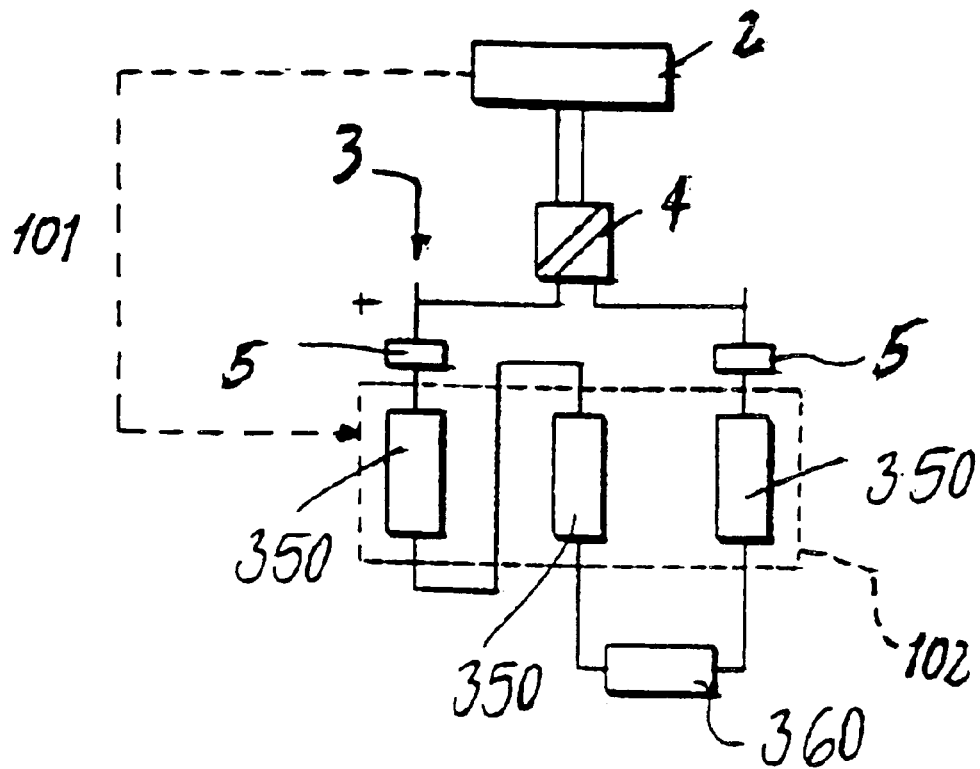
FIGS. 5–6 represent schematically examples of installation of the power supply device, according to the invention, on a DC power distribution line.
Figure 6:
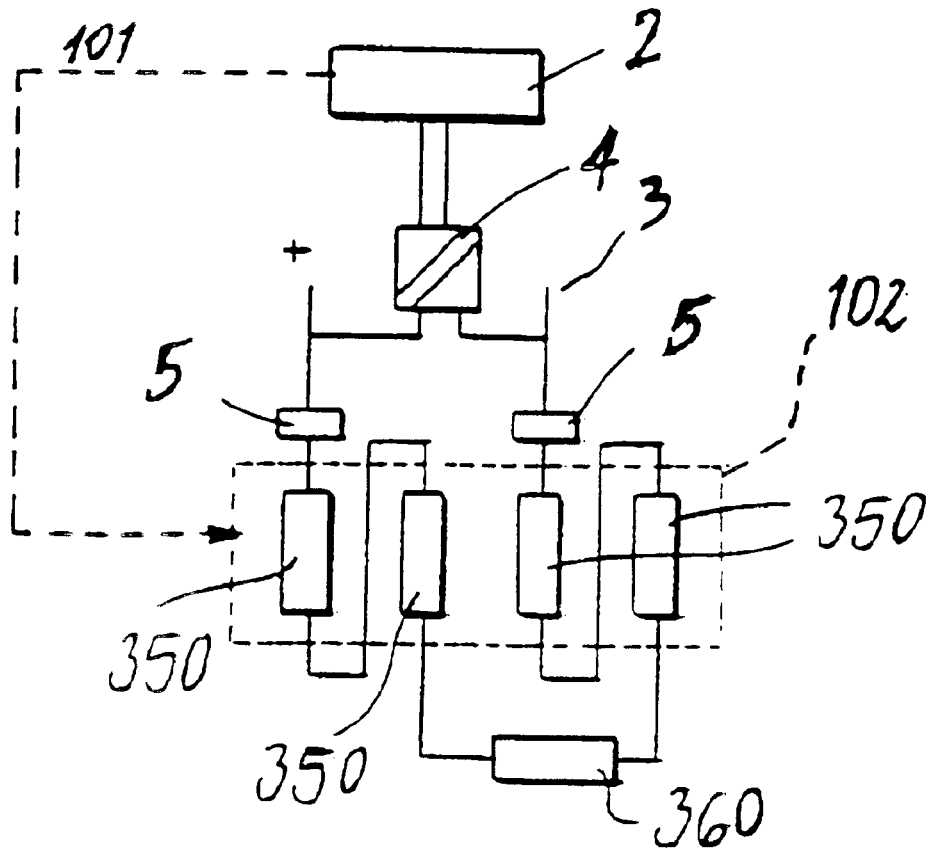

Referring now to FIGS. 4–6, examples of installation of the power supply device, according to the present invention, on a power distribution line are illustrated.

With reference now to FIG. 4, said figure illustrates an embodiment in which the line is a three-phase low-voltage AC line, with a tripping unit 102 (e.g. a circuit breaker with three poles 350). In this case, the first electronic means 4, must be connected with a double-insulated wire to the three phases L1, L2 and L3 of the power distribution line 3. The second electronic means 5 can alternatively comprise a single pick-up coil for the three phases of the line or a single pick-up coil for each phase. All the phases L1–L3 must comprise the second electronic means 5, so that they can be sensitive to any short-circuit toward the ground.

FIGS. 5 and 6 are views of the applications of the power supply device, according to the present invention, in the case of DC low-voltage distribution power line 3. In said figures, the reference numerals 350 designate the poles of the tripping unit 102 (e.g. a circuit breaker), which are three in the case of FIG. 5 and four in the case of FIG. 6. Both solutions use second electronic means 5 arranged on the external collectors, which are wired on the power distribution line 3. It is important to arrange them on opposite sides with respect to a load 360, so as to react to any short-circuit towards the ground.

In practice it has been found that the power supply device, according to the invention, allows achieving the intended aims and objects. The power supply device, according to the invention, allows supplying power to the electronic protection unit 2, in all possible operating conditions, ensuring its reliability in service and its safety.

In order to better illustrate the effectiveness of the power supply device, according to the invention, some examples of operation are described hereafter. In case of nominal operation at system start-up, the first electronic means 4 and the second electronic means 5 both contribute to transduce energy for the third electronic means 6, thus reducing the transient required to reach the steady state. During steady-state operation, the first electronic means 4 help to keep substantially constant the energy accumulated in the third electronic means 6. If a short-circuit occurs, the voltage of the power distribution line 3 becomes zero. The energy stored in the third electronic means 6 is in any case sufficient to still supply the electronic protection unit 2 for the time required to send a tripping signal 101 to the tripping unit 102.

If the circuit breaker closes in the presence of a latent short-circuit, the first electronic means 4 are evidently off, while the second electronic means 5 can still transduce energy for the third electronic means 6, since a current transient is occurring. In this manner, the electronic protection unit 2 is still powered for the time required to send a tripping signal 101 to the circuit breaker 102.

Finally, it has been found that the power supply device, according to the invention, is easy to manufacture in practice and at competitive costs.

What is claimed is:

1. A low and/or medium-voltage DC power distribution network, the network comprising:
   a DC power distribution line which distributes low and/or medium voltage suitable to supply an electrical load;
   a tripping unit arranged along said DC power distribution line in order to interrupt said DC power distribution line responsive to a tripping signal;
   an electronic protection unit which sends one or more tripping signals to said tripping unit; and
   a power supply device being which is electrically connected to said DC power distribution line and to said electronic protection;
   said power supply device comprising:
   sensor means for providing sensing signals indicative of physical quantities related to said DC power distribution line; and
   a control unit, which receives said sensing signals and which provides, based on said sensing signals, command signals to the tripping unit arranged alone said DC power distribution line,
   wherein the control unit comprises:
   first electronic means suitable to transduce energy from said DC power distribution line while in a nominal operating condition; and
   second electronic means suitable to transduce energy from said DC power distribution line while in a transient current operating condition,
   said second electronic means taking over operation from said first electronic means during the transient current operating condition.

2. A low and/or medium voltage DC power distribution network, the network comprising
   a DC power distribution line for distributing low and/or medium voltage, which is suitable to supply an electric load;
   a tripping unit, which is arranged along said a DC power distribution line in order to interrupt said DC power distribution line following the reception of a tripping signal;
   an electronic protection unit for sending to said tripping unit one or more tripping signals;
   a power supply device which is electrically connected to said DC distribution line and to said electronic protection unit,
   wherein said power supply device comprises:
   first electronic means which are suitable to transduce energy from said DC power distribution line in nominal operating conditions;
   second electronic means which are suitable to transduce energy from said DC power distribution line in operating conditions involving a current transient, so as to take over from said first electronic means.

3. A low and/or medium voltage DC power distribution network according to claim 2, wherein said protection unit comprises:
   sensor means, which provide sensing signals indicative of the physical quantities related to said power line; and
   a control unit, which receives said sensing signals and which provides, based on said sensing signals, command signals to said tripping unit.

4. A low and/or medium voltage DC power distribution network according to claim 2, wherein said power supply device comprises third electronic means, which are electrically connected to said first and second electronic means and are suitable to store the energy which is transduced by said first and/or second electronic means.

5. A low and/or medium voltage DC power distribution network according to claim 4, wherein said power supply device comprises fourth electronic means which are electrically connected to said electronic protection unit and transfer the energy stored by said third electronic means to said electronic protection unit and electrically insulate said electronic protection unit from said third electronic means.

6. A low and/or medium voltage DC power distribution network according to claim 4, wherein said first electronic means of said power supply device comprises:
   an electronic charging stage which is electrically connected to said third electronic means and to said power distribution line and is suitable to provide, in nominal operating conditions, a charging current to said third electronic means; and
   an electronic stabilization stage which is electrically connected to said electronic charging stage and to said third electronic means and is suitable to provide said electronic charging stage with driving signals in order to regulate said charging current in nominal operating conditions.

7. A low and/or medium voltage DC power distribution network according to claim 6, wherein said first electronic means of said power supply device comprises a first electronic protection stage which is electrically connected between said electronic charging stage, said power distribution line and said electronic stabilization stage, said first electronic protection stage comprising an optoelectronic circuit which is suitable to detect, on said DC power distribution line, the presence of voltage pulses of relatively long duration.

8. A low and/or medium voltage DC power distribution network according to claim 7, wherein said first electronic means of said power supply device comprises a second electronic protection stage which is electrically connected between said electronic charging stage and the ground, said second electronic protection stage being suitable to detect voltage pulses of relatively short duration which arrive from said power distribution line.

9. A low and/or medium voltage DC power distribution network according to claim 3, wherein said second electronic means comprises:
   an electromagnetic transducer, which is operatively connected to said DC power distribution line and is suitable to generate a charging current during a current transient on said power distribution line;
   an electronic coupling stage, which is suitable to electrically connect said electromagnetic transducer to said third electronic means.

10. A low and/or medium voltage DC power distribution network according to claim 3, wherein said third electronic means of said power supply device comprises one or more capacitive elements, which are suitable to receive a charging current from said first electronic means and/or from said second electronic means and to generate a charging voltage.

11. A low and/or medium voltage DC power distribution network according to claim 3, wherein said fourth electronic means of said power supply device receive in input said charging voltage and provide a first output voltage of predefined value in order to supply said electronic protection unit, said fourth electronic means comprising:
   a first electronic converter stage, which is suitable to receive in input said charging voltage and to generate a second output voltage of predefined value;
   a second electronic converter stage, which is suitable to receive in input said second output voltage and to generate said first output voltage of predefined value, said second converter stage electrically insulating said electronic protection unit from said first converter stage.

* * * * *